United States Patent [19]

Cheng et al.

[11] Patent Number: 5,471,340
[45] Date of Patent: Nov. 28, 1995

[54] REFLECTIVE OPTICAL NON-RECIPROCAL DEVICES

[75] Inventors: Yihao Cheng, Kanata; Gary S. Duck, Nepean, both of Canada

[73] Assignee: JDS Fitel Inc., Nepean, Canada

[21] Appl. No.: 178,838

[22] Filed: Jan. 7, 1994

[51] Int. Cl.$^6$ .............................. G02B 5/30; G02B 27/28; G02F 1/09; G02F 1/095

[52] U.S. Cl. .................... 359/281; 359/484; 359/495; 359/497; 385/11; 385/18

[58] Field of Search .................................. 359/281, 282, 359/283, 484, 494, 495, 496, 497; 372/703; 385/11, 18

[56] References Cited

U.S. PATENT DOCUMENTS

| | | | |
|---|---|---|---|
| 3,781,714 | 12/1973 | Schlossberg | 359/484 |
| 4,294,509 | 10/1981 | Nagao | 359/484 |
| 4,554,449 | 11/1985 | Taniuchi et al. | 385/11 |
| 4,720,162 | 1/1988 | Mochizuki et al. | 385/11 |
| 4,741,588 | 5/1988 | Nicia et al. | 385/11 |
| 4,761,050 | 8/1988 | Byron | 385/11 |
| 4,805,977 | 2/1989 | Tamura et al. | 385/11 |
| 4,960,331 | 10/1990 | Goldman et al. | 359/484 |
| 5,033,830 | 7/1991 | Jameson | 359/484 |
| 5,089,786 | 2/1992 | Tamura | 359/484 |
| 5,115,340 | 5/1992 | Tidwell | 359/484 |
| 5,191,467 | 3/1993 | Kapany et al. | 385/11 |
| 5,204,771 | 4/1993 | Koga | 359/484 |
| 5,212,586 | 5/1993 | Van Delden | 359/484 |
| 5,272,560 | 12/1993 | Baney et al. | 359/484 |
| 5,303,314 | 4/1994 | Duling, III et al. | 385/11 |

FOREIGN PATENT DOCUMENTS

| | | | |
|---|---|---|---|
| 0421654A1 | 9/1990 | European Pat. Off. | G02F 1/09 |
| 2127579 | 9/1983 | United Kingdom | G02B 27/28 |

OTHER PUBLICATIONS

*High–Isolation Polarization–Independent Optical Circulator*, Yohji Fujii, Journal of Lightwave Technology, vol. 9, No. 10, Oct. 1, 1991.

*High–Isolation Polarization–Independent Optical Circulator Coupled With Single–Mode Fibers*, Yohji Fujii, Journal of Lightwave Technology, vol. 9, No. 4, Apr. 1991.

*High–Isolation Polarization–Independent Quasi–Optical Circulator*, Yohji Fujii, Journal of Lightwave Technology, vol. 10, No. 9, Sep. 1992.

*High–Isolation Polarization–Insensitive Optical Circulator For Advance Optical Communications Systems*, Masafumi Koga and Takao Matsumoto, Journal of Lightwave Technology, vol. 10, No. 9, Sep. 1992.

*A Polarization–Independent Optical Circulator for 1.3 μm*, William L. Emkey, Journal of Lightwave Technology, vol. LT–1, No. 3, Sep. 1983.

*Polarisation–Independent Optical Circulator Consisting of Two Fibre–Optic Polarising Beam Splitters and Two Yig*

(List continued on next page.)

*Primary Examiner*—Martin Lerner
*Attorney, Agent, or Firm*—Thomas Adams

[57] ABSTRACT

In order to reduce the number of components and avoid relatively long optical lengths, a non-reciprocal device such as a circulator comprises a plurality of ports at one end of the device, a mirror at an opposite end of the device, and a series of optical elements disposed between the ports and the mirror. The optical elements include a first element which spatially separates first and second orthogonally-polarized components of a light beam leaving one of said plurality of ports and passing through the device in a forward direction, and recombines the first and second components as they pass through the device in a reverse direction after reflection. A second optical element, disposed between the separating and recombining element and the mirror, selectively displaces and rotates the light beam components such that the recombined light beam is coupled to a different one of the plurality of ports.

15 Claims, 5 Drawing Sheets

OTHER PUBLICATIONS

Spherical Lenses, I. Yokohama, K. Okamoto and J. Noda, Electronics Letters, vol. 22, No. 7, Mar. 27, 1986.

*Compact Polarization–Independent Optical Circulator,* M. Shirasaki, H. Kuwahara, and T. Obokata, Applied Optics, vol. 20, No. 15, Aug. 1981.

*Polarization–Independent Optical Circulator: An Experiment,* Takao Matsumoto and Ken–ichi Sato, Applied Optics, vol. 19, No. 1, Jan. 1, 1980.

*Compact Optical Circulator For Optical Fiber Transmission,* Atsushi Shibukawa and Morio Kobayashi, Applied Optics, vol. 18, No. 21, Nov. 1, 1979.

*Polarisation–Insensitive High–Isolation Nonreciprocal Device For Optical Circulator, Application,* M. Koga and T. Matsumoto, Electronic Letters vol. 27, No. 11, May 23, 1991.

REFLECTIVE OPTICAL NON-RECIPROCAL DEVICES

TECHNICAL FIELD

This invention relates to optical devices, especially non-reciprocal devices such as circulators and isolators for use in optical communications systems.

BACKGROUND ART

Known optical isolators comprise an input port and an output port at opposite ends of the device. Between the input and output port, a typical isolator has, in sequence, a polarization-dependent light beam division element, a polarization rotator, and a polarization-dependent light beam recombining element. These components are used for separating, rotating and recombining orthogonally polarized beams in such a way that light beams travel from the input port to the output port whereas light beams from the output port and travelling in the opposite direction are diverted so that they do not reach the input port.

Known optical circulators comprise additional input ports and/or output ports. A polarization-dependent division element, a first polarization rotator, a spatial "walk-off" or light beam displacement element, a second polarization rotator and a polarization mixing element are used to separate, rotate and combine orthogonally polarized beams to provide coupling between selected pairs of the input and output ports.

A disadvantage of such known non-reciprocal devices is the large number of components involved, and relatively long overall length.

SUMMARY OF THE INVENTION

An object of the present invention is to eliminate or at least mitigate the disadvantages of known optical non-reciprocal devices and provide an improved optical non-reciprocal device.

According to the present invention there is provided an optical non-reciprocal device for coupling light beams between a plurality of ports, the device comprising at least a first port and a second port at one end of the device, mirror means at an opposite end of the device and, disposed between the plurality of ports and the mirror means, optical elements for spatially separating first and second components of a light beam leaving said first port, conveying the first and second components non-reciprocally to and from the mirror means such that the first and second components travel along first and second paths, respectively, recombining said first and second components, and coupling the recombined light beam to the second port. The optical elements are so configured that a second light beam leaving the second port will be separated into first and second polarization components. The first and second polarization components of the second light beam will travel along third and fourth paths, respectively, and be recombined at a position at said one end of the device, which position is spaced from both the first port and the second port in a plane extending through the first and second ports.

The optical elements may comprise a polarization-dependent displacement element, for example a birefringent "walk-off" crystal, having a displacement axis, a first polarization rotator, for example a Faraday rotator, between the displacement element and the mirror means, and a second polarization rotator, specifically a Faraday rotator, between the ports and the displacement element. The relative inclinations of the various components and the rotation provided by the polarization rotator may then be such that each light beam component passes through the displacement element in one direction with its plane of polarization aligned with the displacement axis and is displaced, and in the other direction with its plane of polarization perpendicular to the displacement axis, and is not displaced.

More particularly, the polarization-rotator and the mirror may act together to reverse the direction of travel of the light beam components and to rotate their polarization planes through 90 degrees so that each beam component will be displaced (receive a "walk-off") when traversing the displacement element in one direction, but not in the opposite direction.

The displacement element may comprise two segments with their respective displacement axes parallel to each other, but opposed, one of the segments being disposed in the first path and the other of the segments being disposed in the second path, the first and second light beam components passing through respective ones of the segments in one direction with their respective planes of polarization perpendicular to the displacement axis and in the opposite direction with their planes of polarization parallel to the displacement axis.

Alternatively, the displacement element may have the same displacement axis for both paths and the optical elements comprise a half-wave plate or similar rotator for rotating one of the first and second components until the planes of both components are parallel.

Various objects, features, aspects and advantages of the present invention will become more apparent from the following detailed description, taken in conjunction with the accompanying drawings, of preferred embodiments of the invention.

BRIEF DESCRIPTION OF DRAWINGS

FIGS. 1A and 1B are a schematic plan view and a schematic side elevational view of an optical circulator, while

In the drawings, corresponding components in the different Figures have the same reference numeral, with a suffix letter or prime where appropriate.

BEST MODE FOR CARRYING OUT THE INVENTION

Figure 1A:
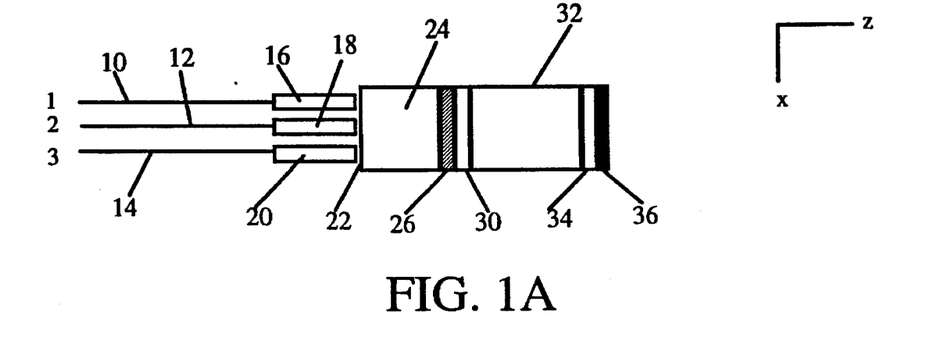

As shown in FIG. 1A, a circulator comprises three ports 1, 2 and 3 comprising three optical waveguides 10, 12 and 14, respectively, coupled by way of one quarter pitch rod lenses 16, 18 and 20, respectively, to the same face 22 of a birefringent calcite crystal 24. Each optical waveguide comprises a portion or "pigtail" of single mode optical fiber. A polarization rotation element, which comprises a pair of half-wave plates 26 and 28 and a Faraday rotator 30, is arranged as a sandwich between the opposite face of birefringent crystal 24 and the opposed face of a second birefringent crystal 32. A polarization exchange reflector, formed by another Faraday rotator 34 and a mirror 36, is provided at the other face of birefringent crystal 32. One side of the Faraday rotator 34 abuts the face of the crystal 32. The mirror 36 is formed by coating the opposite side of the Faraday rotator 34 to form a 100 per cent reflection mirror. The first birefringent crystal 24 is of calcite and serves to divide light beam components leaving the ports 1, 2 and 3 and recombine light beam components travelling towards the ports 1, 2 and 3. The second birefringent crystal 32, which also is calcite, acts as a "walk-off" or beam displacement device.

Figure 1B:
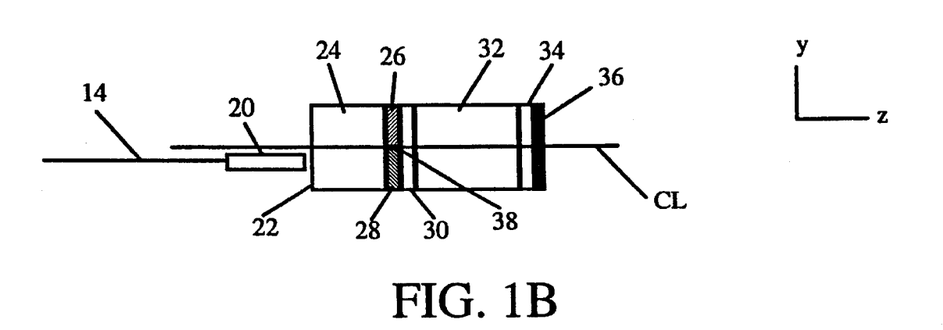

The half-wave plates 26 and 28 are each half the width of the device and abut edge-to-edge at a joint 38 on its center line CL, as can be seen from FIG. 1B. The lenses 16, 18 and 20 are arranged in a row with their optical axes offset to one side of a longitude plane through the center line CL, i.e. through joint 38 between the two half-wave plates 26 and 28.

Figure 1C:
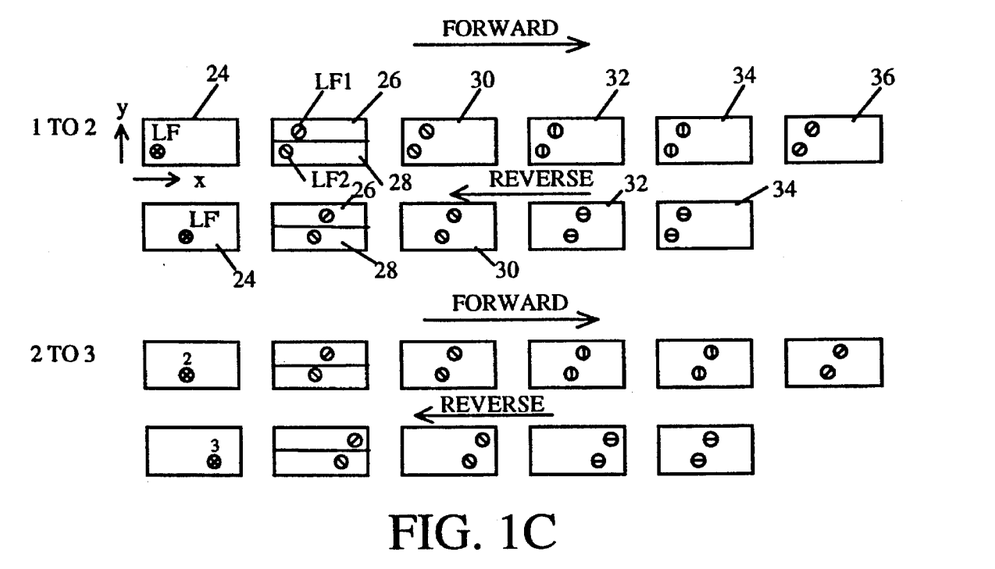
FIG. 1C illustrates the passage of light beam components through the circulator of FIGS. 1A and 1B.

In use, light beam components from port 1 travel through the optical elements 24, 26 or 28, 32 and 34, are reflected by mirror 36, and travel through the optical elements again in the opposite direction to reach port 2. The light beam components LF1 and LF2 travel along different paths, as illustrated in FIG. 1C, in which the blocks represent views of each interface between optical elements, looking towards the mirror 36. The first two rows of blocks show passage of light beam components from port 1 to port 2 and the second two rows of blocks show passage of light beam components from port 2 to port 3.

In FIGS. 1A and 1B, axis X is parallel to the joint 38, axis Y is perpendicular to it and axis Z is parallel to the optical path or center line CL. The first birefringent crystal 24 has its displacement axis extending at 45 degrees to the X and Y axes. A light beam LF from port 1 leaving lens 16 is split into two orthogonally polarized beams by the first birefringent crystal 24 which shifts the extraordinary axis beam component LF1 at 45 degrees relative to the X and Y axes while allowing the ordinary axis beam component LF2 to pass straight through. As can be seen from FIG. 1C, beam component LF1 is shifted beyond the center line CL so that it will pass through upper half-wave plate 26, whereas beam component LF2 passes through the lower half-wave plate 28.

The half-wave plate 26 is positioned with its "fast" and "slow" axes parallel to the Y axis and X axis, respectively. The "fast" and "slow" axes of half-wave plate 28 are parallel to, and perpendicular to, respectively, the plane of polarization of second beam component LF2, i.e. at 45 degrees to the X axis. Half-wave plate 26 rotates the plane of polarization of beam component LF1 through 90 degrees, while beam component LF2 passes through half-wave plate 28 unchanged. Consequently, when the two beam components LF1 and LF2 emerge from the half-wave plates 26 and 28, their planes of polarization are parallel but at an angle of 45 degrees to the X axis. The Faraday rotator 30 rotates the polarization direction of each beam component 45 degrees clockwise so that their planes of polarization are perpendicular to the X axis when they enter the second calcite birefringent crystal 32. The beam shift axis of birefringent crystal 32 is parallel to the X axis so both beam components LF1 and LF2 pass through it unchanged. The Faraday rotator 34 provides a further 45 degrees of rotation before the beam components LF1 and LF2 reach the mirror 36. After reflection by mirror 36, the beam components LF1 and LF2 pass through the Faraday rotator 34 again so that, when entering the birefringent crystal 32 in the reverse direction, their planes of polarization are parallel to the X axis. This direction corresponds to the extraordinary-ray direction of the second calcite birefringent crystal 32. Consequently, as the beam components LF1 and LF2 pass through the crystal 32 in the reverse direction, they are both shifted along the X axis. The amount of shift is determined by the "walk-off" distance of the calcite crystal 32. The two beams LF1 and LF2 then pass through the first Faraday rotator 30 and the half-wave plates 26 and 28 in the reverse direction. Faraday rotator 30 rotates them both by 45 degrees. Half-wave plate 26 rotates the polarization axis of beam component LF1 while allowing beam component LF2 to pass through unchanged. The beam components LF1 and LF2 are then recombined by the first birefringent crystal 24 which displaces beam component LF 1 obliquely. It should be noted, however, that the combined beam LF' is displaced relative to original beam LF by a distance equal to the spacing between lenses 16 and 18. Consequently, it is coupled to lens 18 and fiber 12 to emerge through port 2. The dimensions of the various components are arranged so that substantially all of the light from port 1 couples to port 2.

The third and fourth rows of FIG. 1C show how, in like manner, a light beam launched from port 2 by way of fiber 12 and lens 18 will pass through the device and be shifted spatially in the X direction to couple to port 3 by way of lens 20 and fiber 14. The sequence will not be described in detail since it can be inferred from the drawing.

It should be appreciated that, in this embodiment, the second half-wave plate 28B does not actually need to do anything more than transmit the beam component LF2. It merely acts as a spacer. Using a second half-wave plate, however, facilitates matching of dimensions.

Figure 2A:
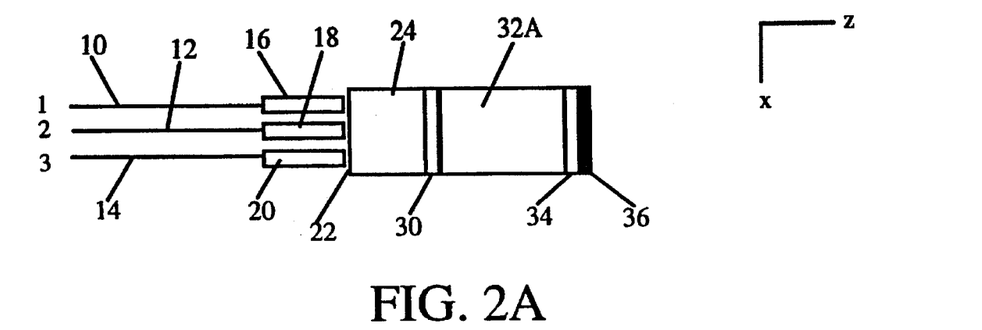
FIG. 2A and 2B are corresponding plan and side views, respectively, of a second optical circulator embodying the invention, with FIG. 2C illustrating passage of light beam components through it.
Figure 2B:
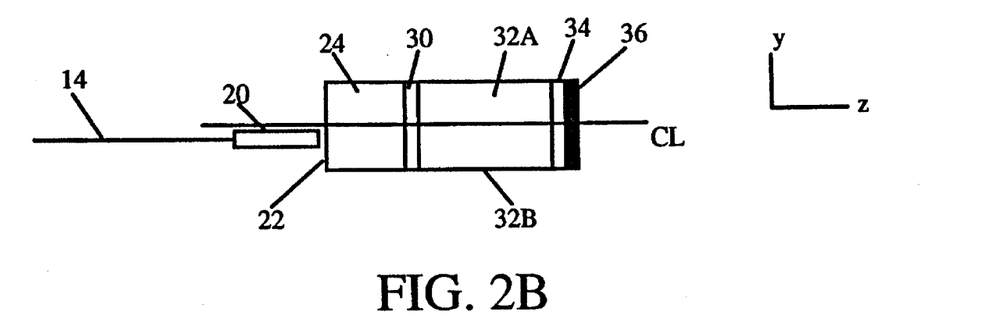

FIGS. 2A and 2B illustrate an alternative form of circulator which comprises three optical waveguides 10, 12 and 14 coupled by way of lenses 16, 18 and 20, respectively, to the one face 22 of a first birefringent calcite crystal 24. A first Faraday rotator 30 abuts the opposite face of crystal 24. Two separate birefringent calcite crystal segments 32A and 32B are provided in parallel between the first Faraday rotator 30 and a second Faraday rotator 34 which has a mirror 36 on its outer face. The birefringent crystals 32A and 32B are the same length. Each of the crystals is half the width of the Faraday rotators 30 and 34 and their opposed surfaces 38 abut along a center line CL. As before, the row of lenses 16, 18 and 20 are offset to one side of this center line CL. The respective beam displacement axes of birefringent crystal segments 32A and 32B are parallel to each other and the X axis, but opposed so as to provide spatial "walk-off" in opposite directions.

Figure 2C:
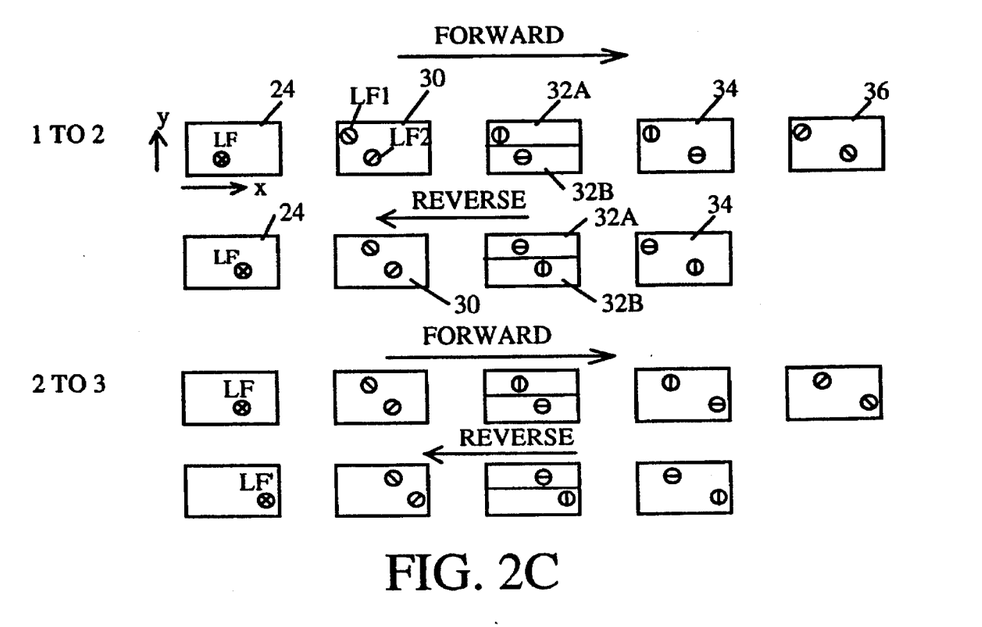

In FIG. 2C, the first two rows of blocks illustrate passage of beam components from port 1 to port 2 and the third and fourth rows passage of light beam components from port 2 to port 3. The first birefringent crystal 24 splits a light beam LF from port 1 into two orthogonally polarized beams LF1 and LF2 by displacing beam component LF1 at 45 degrees relative to axes X and Y while allowing beam component LF2 to pass straight through. The first Faraday rotator 30 rotates both beam components through 45 degrees clockwise. Consequently, the first beam component LF1 leaves the Faraday rotator 30 with its plane of polarization parallel to the Y axis. Hence, it passes through the birefringent crystal segment 32A unchanged because its plane of polarization is aligned with the ordinary-ray direction of the crystal 32A. The second beam component LF2 leaves the Faraday rotator 30 with its plane of polarization parallel to the X axis and so is displaced by the birefringent crystal 32A, i.e. it receives a "walk-off" (shown as to the right in FIG. 2C).

The second Faraday rotator 34 rotates the two beam components LF1 and LF2 through a further 45 degrees before they strike mirror 36. Following reflection by mirror 36 and further rotation by second Faraday rotator 34, first beam component LF1 becomes horizontally polarized. Consequently, as it passes through birefringent crystal segment 24A in the reverse direction, it is displaced, i.e. receives a "walk-off", (to the right as shown). The second beam LF2 also is translated through the Faraday rotator 34 and mirror 36 so that, when it enters the birefringent crystal 32B in the reverse direction, its plane of polarization is aligned with the ordinary axis of the birefringent crystal 32B. Consequently, it passes through birefringent crystal 32B unchanged. The two reverse beam components LF1 and LF2 then are rotated by the first Faraday rotator 30 and pass through birefringent crystal 24 again, which re-combines them by shifting beam component LF1 obliquely while allowing beam component LF2 to pass straight through. It will be seen that the re-combined beam LF is offset from beam LF by a distance equal to the spacing between the lenses 16 and 18 so that it couples to port 2 via lens 18 and fiber 12.

Figure 3A:
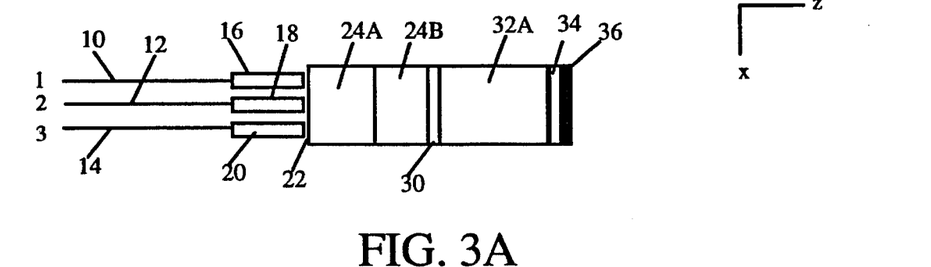
FIGS. 3A and 3B are top and side views respectively, of an alternative construction of optical circulator embodying the invention, with FIG. 3C illustrating the passage of light beam components through it.
Figure 3B:
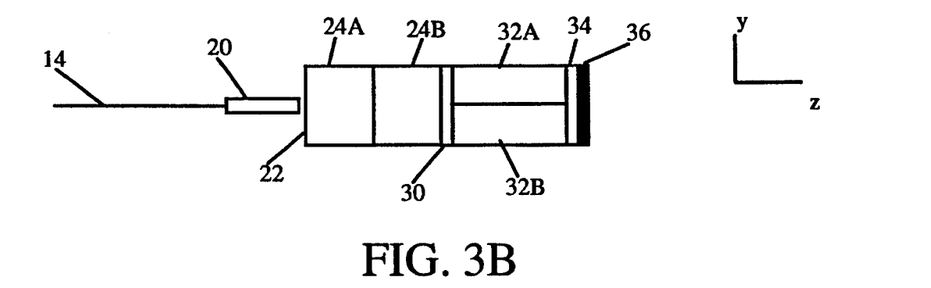

FIGS. 3A and 3B illustrate yet another circulator differing from that of FIGS. 2A and 2B in that it comprises two birefringent crystals 24A and 24B, in series, with their displacement directions perpendicular to each other and at 45 degrees to the X axis. The two birefringent crystals 24A and 24B have the same optical length. The lenses 16, 18 and 20 are positioned adjacent face 22 of the first birefringent crystal 24A, but in this case aligned in the longitudinal plane through the joint between the opposed surfaces 38 of the "walk-off" birefringent crystals 32A and 32B. The remaining components of the circulator are the same as the circulator of FIGS. 2A and 2B, namely a first Faraday rotator 30 preceding the birefringent crystals 32A/32B and a second Faraday rotator 34 and mirror 36 following them.

Figure 3C:
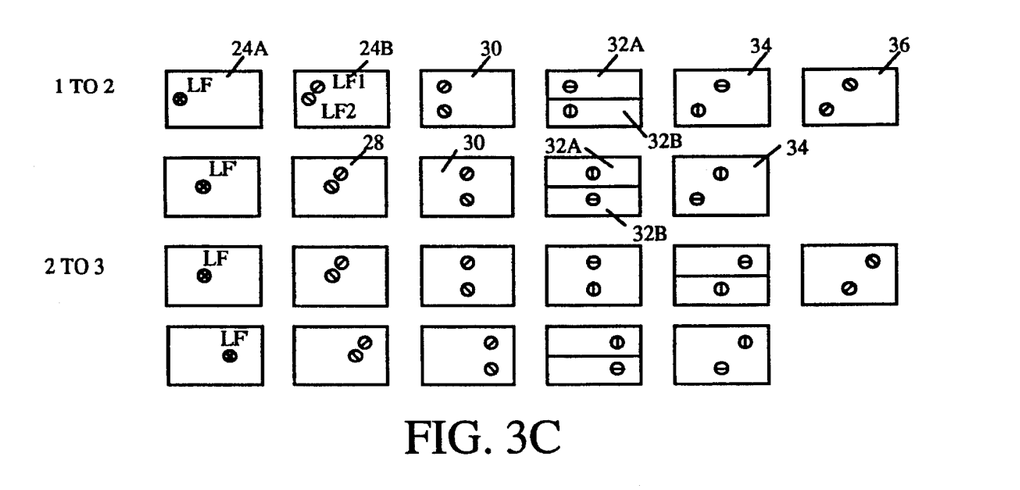

As illustrated in FIG. 3C, a light beam LF leaving lens 16 (port 1) is split into two beam components LF1 and LF2 by birefringent crystal 24A which displaces beam component LF1 obliquely and upwards (as shown) while allowing beam component LF2 to pass straight through. The second birefringent crystal 24B allows beam component LF1 to pass straight through but displaces beam component LF2 obliquely and downwards so that it is beneath (as shown) beam component LF1. The two beam components LF1 and LF2 are thus either side of a longitudinal plane through the joint between birefringent "walk-off" crystals 32A and 32B.

Faraday rotator 30 rotates both beam components through 45 degrees so that the polarization planes of beam component LF1 and LF2 are parallel to the X axis and Y axis, respectively. Birefringent crystal segment 32A displaces beam component LF1 (to the right) in FIG. 3C, while beam component LF2 passes straight through birefringent crystal segment 32B. The beam components LF1 and LF2 are rotated by second Faraday rotator 34, reflected by mirror 36, and rotated again by second Faraday rotator 34 before re-entering the respective birefringent crystal segments 32A and 32B in the reverse direction. By this time, the polarization axis of beam component LF1 is perpendicular to the X axis and that of beam component LF2 is perpendicular to the Y axis. Consequently, beam component LF1 passes straight through birefringent crystal segment 32A while beam component LF2 is displaced (to the fight in FIG. 3C) by birefringent crystal segment 32B. After rotation by first Faraday rotator 30, the beam components LF1 and LF2 are recombined by the birefringent crystals 24B and 24A at a position offset from original beam LF. On leaving face 22 of birefringent crystal 24A, the recombined beam LF' couples via lens 18 to port 2. Coupling of a light beam from port 2 to port 3 takes place in a similar way and so need not be described.

Figure 4A:
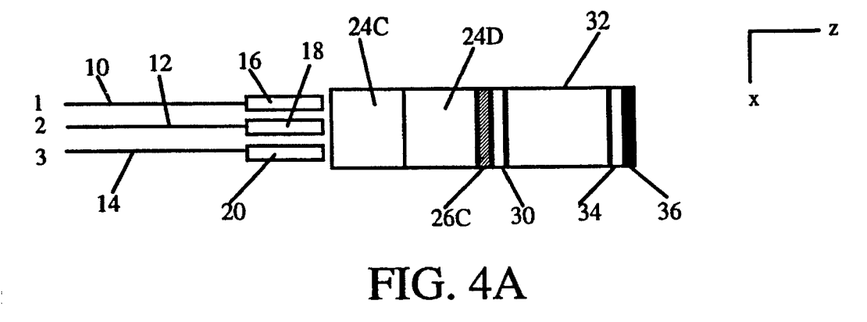
FIGS. 4A and 4B are a schematic plan view and a schematic side elevational view respectively, of another optical circulator embodying the invention, with FIG. 4C illustrating the passage of light beam components through it.
Figure 4B:
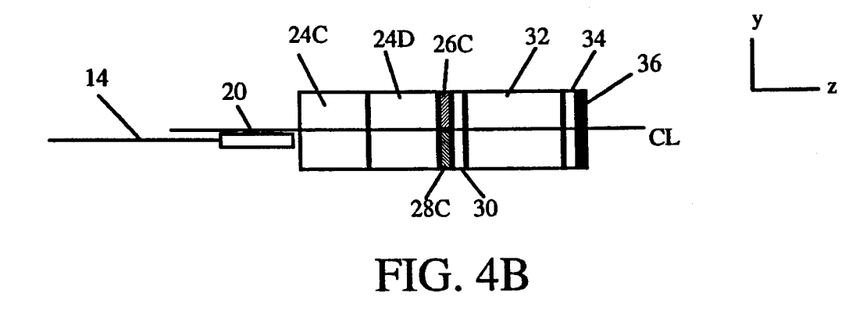

FIGS. 4A and 4B illustrate how the circulator of FIGS. 1A and 1B could be modified by using two birefringent crystals 24C and 24D, with the lenses 16, 18 and 20 offset relative to the joint 34 between half-wave plates 26 and 28. The birefringent crystals 24C and 24D have identical optical lengths. The displacement axes of crystals 24C and 24D are parallel to the Y axis and X axis, respectively. The optical axis of half-wave plate 26 extends at −22.5 degrees to the Y axis and the optical axis of half-wave plate 28 at +22.5 degrees to the Y axis. Other components correspond to those of FIGS. 1A and 1B.

Figure 4C:
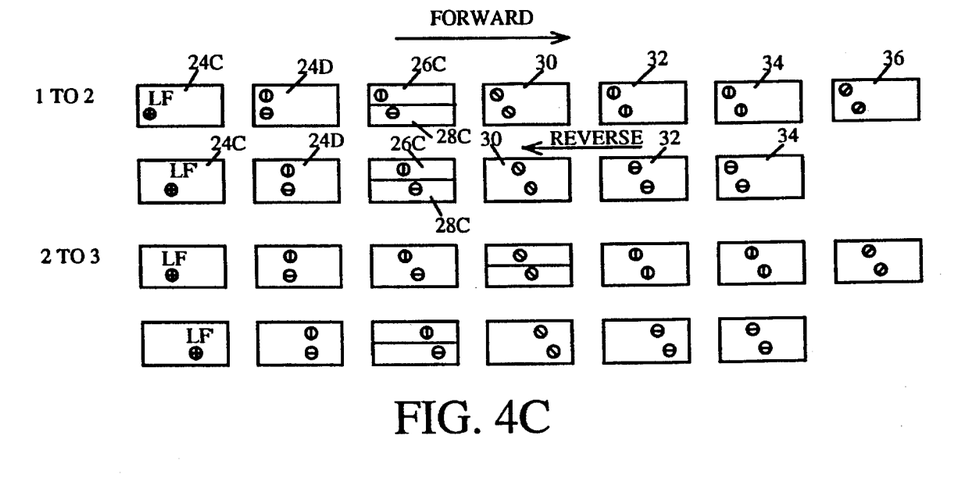

The passage of light beam components LF1 and LF2 through the device is depicted in FIG. 4C. A light beam LF from port 1 is split into first and second components LF1 and LF2 by first birefringent crystal section 24C, which displaces component LF1 in the direction of the Y axis so that the beam components LF1 and LF2 are on opposite sides of a longitudinal plane through the joint 38 between half-wave plates 26C and 28C. The second birefringent crystal section 24D displaces the second component LF2 along the X axis. On arrival at half-wave plates 26C and 28C, the beam components LF1 and LF2 have their polarization planes parallel to the Y axis and the X axis, respectively. The half-wave plates 26C and 28C rotate beam components LF1 and LF2 through 45 degrees anticlockwise and clockwise, respectively. The Faraday rotator 30 then rotates them through 45 degrees clockwise before they enter birefringent crystal 32. Consequently, the polarization planes of beam components LF1 and LF2 are parallel to each other and the Y axis as they pass through birefringent crystal 32, and neither is displaced. Following rotation and reflection by Faraday rotator 34 and mirror 36, the beam components pass through the birefringent crystal 32 in the reverse direction with their polarization planes parallel to the X axis. Consequently, both beam components are shifted; shown as to the right in FIG. 4C. The Faraday rotator 30 and half-wave plates 26C and 28C rotate the beam components LF1 and LF2 so that they enter the birefringent crystal sections 24D and 24C with their polarization planes parallel to the Y axis and X axis again. Birefringent crystal 24D shifts beam component LF2 to the left (as shown) and birefringent crystal section 24C shifts beam component LF1 downwards (as shown) to form recombined light beam LF'.

As can be seen from FIG. 4C, the recombined light beam LF' is offset relative to original light beam LF and so couples to the port 2 via lens 18 and fiber 12. Passage of a light beam from port 2 to port 3 takes place in a similar manner, as depicted in FIG. 4C, and need not be described.

The use of the two birefringent crystals 24A and 24B or 24C and 24D allows the path lengths for the two beam components LF1 and LF2 to be the same, resulting in reduced polarization mode dispersion.

It will be appreciated that various modifications may be made within the ambit of the invention. For example, the Faraday rotator 34 could be replaced by other polarization rotators, such as quartz rotators or wave plates.

Figure 5:
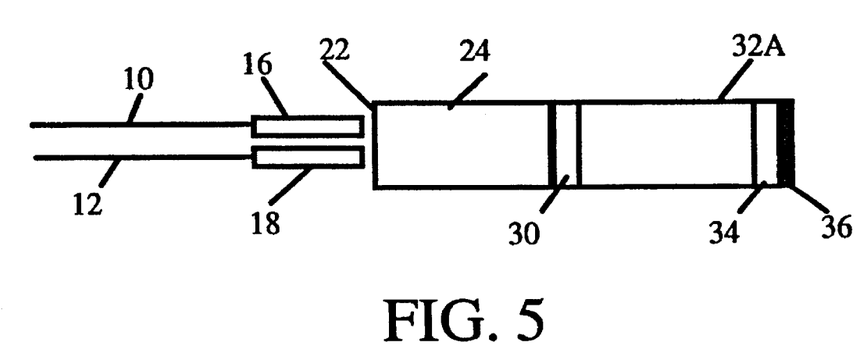
FIG. 5 illustrates an isolator embodying the invention.

It should be noted that, because there is no coupling from port 2 to port 1 or from port 3 to port 2, any of the above-described circulators could be converted into an isolator by omitting the third port. One example of such an isolator is shown in FIG. 5, which shows an isolator having the same components as the circulator shown in FIG. 2A, but having only two ports, namely fibers 10 and 12 and lenses 14 and 16. Light beams can pass from port 1 to port 2 as described with reference to FIG. 1C, but unwanted light from port 2 cannot couple back to port 1.

An advantage of embodiments of the invention is that the same optical element is used both to separate the light beams and to recombine them. This avoids problems with tight tolerances where separate elements are used. An additional advantage is their low number of components and relatively low cost.

Although embodiments of the invention have been described and illustrated in detail, it is to be clearly understood that they are by way of illustration and example only and is not to be taken by way of limitation, the spirit and scope of the present invention being limited only by the appended claims.

What is claimed is:

1. An optical non-reciprocal device for coupling light beams between a plurality of ports, the device comprising at least a first port and a second port at one end of the device, mirror means at an opposite end of the device and, disposed between the plurality of ports and the mirror means, a optical elements for spatially separating first and second polarization components of a light beam leaving said first port, conveying the first and second polarization components non-reciprocally to and from the minor means such that the first and second polarization components travel along first and second paths, respectively, recombining said first and second polarization components and coupling the recombined light beam to the second port, the optical elements being configured such that a second light beam leaving the second port will be separated into first and second polarization components, and the first and second polarization components of the second light beam will travel along third and fourth paths, respectively, and be recombined at a position at said one end of the device, which position is spaced from both the first port and the second port in a plane extending through the first and second ports.

2. A device as claimed in claim 1, wherein the optical elements comprise a polarization-dependent displacement element for displacing a said polarization component having its polarization plane parallel to a displacement axis of the displacement element, and a polarization rotation element disposed between the displacement element and the mirror means for rotating the polarization direction of a said light beam polarization component by 90 degrees after its passage through the displacement element towards the mirror means and before its passage through the displacement element travelling away from the mirror means.

3. A device as claimed in claim 2, wherein the polarization rotation element provides rotation through 45 degrees for each direction of passage of the polarization components.

4. A device as claimed in claim 3, wherein the mirror means comprises a coating on a surface of the polarization rotation element.

5. A device as claimed in claim 1, wherein the optical elements comprise a polarization-dependent displacement element for displacing a said polarization component having its polarization plane parallel to a displacement axis of the displacement element, and a Faraday rotation element disposed between the displacement element and the mirror means for rotating the polarization direction of a said polarization component by 45 degrees during its passage therethrough towards the mirror means and by a further 45 degrees during its passage therethrough travelling away from the mirror means, the mirror means comprising a coating upon a surface of the Faraday rotation element remote from the displacement element.

6. A device as claimed in claim 1, wherein the optical elements comprise separating and recombining means for separating a light beam from the first port into said first and second polarization components, such that the first and second polarization components have planes of polarization perpendicular to each other, and recombining said first and second polarization components of said light beam from the first port returning thereto after reflection by the mirror means and coupling the recombined light beam to the second port, a Faraday rotation element and a polarization rotation element for rotating the first and second polarization components during passage therethrough towards the mirror means so that their polarization axes are parallel, a polarization-dependent displacement element disposed between the Faraday rotation element and the mirror means, for displacing said polarization components having polarization planes parallel to a displacement axis of the displacement element, and a second polarization rotation element disposed between the displacement element and the mirror means for routing the polarization direction of said polarization components by 90 degrees after passage through the displacement element towards the mirror means and before passage through the displacement element travelling away from the mirror means.

7. A device as claimed in claim 6, wherein the separating and recombining element has a displacement axis extending at 45 degrees relative to a direction of spacing of the first and second ports, such that the first polarization component is shifted at 45 degrees relative to the second component, and the first polarization rotation element is arranged to rotate the first polarization component through 90 degrees relative to the second polarization component.

8. A device as claimed in claim 1, wherein the optical elements comprise a separating and recombining element for separating the first and second polarization components by displacing one of the polarization components in a direction at 45 degrees relative to its plane of polarization, and recombining the first and second polarization components returning therethrough by displacing the first polarization component oppositely to its initial displacement, a polarization-dependent displacement element for displacing each said polarization component dependent upon its polarization plane being parallel to a displacement axis of the displacement element, the displacement axis being the same for both the first and second polarization components, a Faraday rotator and a rotation element disposed between the separating and recombining element and the displacement element for rotating the polarization components until their planes of polarization are parallel, and a polarization rotation element disposed between the displacement element and the mirror means for rotating the polarization direction of a said polarization component by 90 degrees after its passage through the displacement element towards the mirror means and before its passage through the displacement element travelling away from the mirror means.

9. A device as claimed in claim 8, wherein the Faraday rotator provides 45 degrees of rotation for each direction of traverse and the rotation element provides 90 degrees of rotation.

10. A device as claimed in claim 1, wherein the optical elements comprise a separating and recombining element for separating said light beam from the first port to provide said first and second polarization components having their respective planes of polarization perpendicular to each other, and recombining the first and second polarization components returning therethrough and coupling the recombined beam to the second port, a polarization-dependent displacement element having two segments with their respective displacement axes parallel to each other but opposed, one of the segments being disposed in the first path and the other of the segments being disposed in the second path, the separating and recombining element being arranged so that the first and second polarization components leave the separating and recombining element with their respective polarization planes at 45 degrees to the respective displacement axes of the displacement element segments, a Faraday rotation element between the separating and recombining element and the displacement element for rotating the first and second polarization components so that their polarization planes are parallel to one of the displacement axes of the displacement element segments, and a polarization rotation element disposed between the displacement element and the mirror means for rotating the polarization direction of each said polarization component by 90 degrees after its passage through the corresponding displacement element towards the mirror means and before its passage through the displacement element travelling away from the mirror means.

11. A device as claimed in claim 1, further comprising a third port disposed alongside the first and second ports, such that said second light beam from the second port will pass through the optical elements, be reflected by the mirror means, recombined into a second recombined light beam and the second recombined light beam coupled to the third port.

12. A device as claimed in claim 1, wherein the optical elements comprise a separating and recombining optical element for separating said first and second polarization components passing therethrough towards the mirror means and recombining said first and second polarization components passing therethrough away from the mirror means, the separating and recombining element comprising cascaded first and second birefringent crystals having similar optical lengths and their respective displacement axes perpendicular to each other and to a direction of travel of the light beams.

13. A device as claimed in claim 1, wherein the optical elements comprise first and second birefringent crystals element for separating said first and second polarization components passing therethrough towards the mirror means and recombining said first and second polarization components passing therethrough away from the mirror means, a polarization-dependent displacement element having first and second segments with their respective displacement axes parallel to each other, the first segment being disposed in the first path and the second segment being disposed in the second path, each segment for displacing a said polarization component having its polarization plane parallel to a displacement axis of the displacement element segment, the first and second birefringent crystals being disposed so that the first and second polarization components emerge therefrom with their polarization planes perpendicular to each other and at 45 degrees to the displacement axes for the segments, a Faraday rotation element disposed between the second birefringent crystal and the displacement element segments for rotating the first and second polarization components so that their polarization planes are aligned with one of the displacement axes, and a polarization rotation element disposed between the displacement element segment and the mirror means for rotating the polarization direction of each said polarization component by 90 degrees after its passage through the displacement element segment towards the mirror means and before its passage through the displacement element segment travelling away from the mirror means.

14. A device as claimed in claim 1, wherein the optical elements comprise a separating and recombining optical element for separating said first and second polarization components passing therethrough towards the mirror means and recombining said first and second polarization components passing therethrough away from the mirror means, a polarization-dependent displacement element for displacing a said polarization component having its polarization plane parallel to a displacement axis of the displacement element segment, the separating and recombining element comprising a first birefringent crystal having its displacement axis perpendicular to a first plane extending through the first port and second port, and a second birefringent crystal having its displacement axis parallel to said first plane, first and second rotation elements and a Faraday rotation element disposed between the second birefringent crystal and the displacement element for rotating the first and second polarization components so that their polarization planes are aligned with one of the displacements axes, and a polarization rotation element disposed between the displacement element segment and the minor means for rotating the polarization direction of each said polarization component by 90 degrees after its passage through the displacement element segment towards the mirror means and before its passage through the displacement element segment travelling away from the mirror means, the first rotation element being disposed in the first path between the second birefringent crystal and the Faraday rotation element and the second rotation element being disposed in the second path between the second birefringent crystal and the Faraday rotation element, the first rotation element and the second rotation element having their respective optical axes disposed each at an angle of 22.5 degrees either side of a central plane perpendicular to said first plane, such that each said polarization component passes through the displacement element in one direction aligned with its plane of polarization aligned with the displacement axis and in the other direction with its plane of polarization perpendicular to the displacement axis.

15. A device as claimed in claim 14, further comprising a third port disposed alongside the first and second ports, such that a second light beam from the second port will pass through the optical elements, be reflected by the mirror means, recombined into a second recombined light beam and the second recombined light beam coupled to the third port.

* * * * *